Aug. 1, 1933.                H. F. KHOENLE                1,920,935
                          ARTIFICIAL FISH BAIT
                          Filed Feb. 10, 1930

INVENTOR
HERMAN F. KOEHNLE
BY
ATTORNEYS.

Patented Aug. 1, 1933

1,920,935

UNITED STATES PATENT OFFICE 1,920,935

ARTIFICIAL FISH BAIT

Herman F. Khoenle, Akron, Ohio, assignor to The Enterprise Manufacturing Company, Akron, Ohio, a Corporation of Ohio Application February 10, 1930. Serial No. 427,084

4 Claims. (Cl. 43—47)

This invention relates to artificial fish baits.

The general purpose of the invention is to provide an improved artificial fish bait of material such as celluloid shaped to simulate a small slender fish.

A particular object of the invention is to provide a bait of heavy material such as celluloid with an effectively applied fin so associated therewith as to keep said bait in correct position as it travels through the water.

A further object of the invention is to provide an improved construction for securing hooks and, if desired, a spinner on an end of the bait body.

The foregoing and other objects of the invention are attained in the artificial fish bait shown in the accompanying drawing and described below, it being understood that features of the invention are applicable to other than the specific form thereof illustrated and described.

Of the accompanying drawing.

Figure 1:
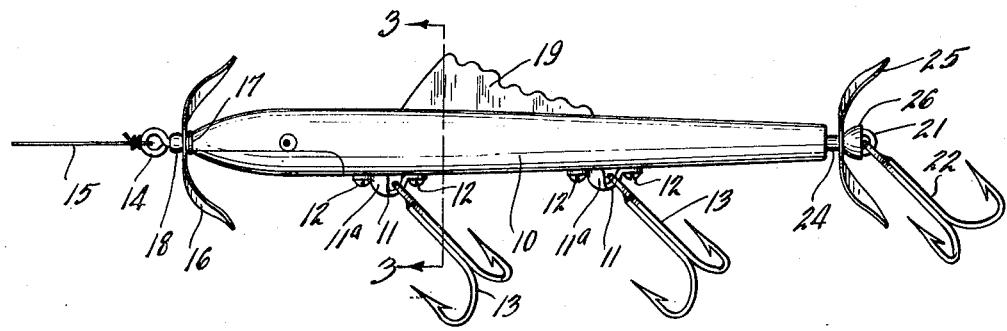
Figure 1 is a side elevation of the improved bait.
Figure 2:
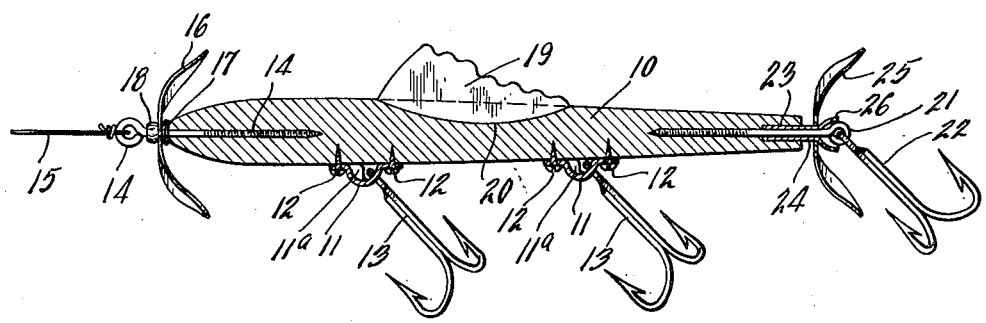
Figure 2 is a central longitudinal section therethrough.
Figure 3:
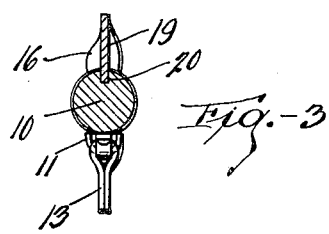
Figure 3 is a section on line 3—3 of Figure 1.

Referring to the drawing, the numeral 10 designates a bait body of molded material such as celluloid which may be of such shape and suitably decorated to simulate a fish. One or more loop elements 11 are provided on the under side of the bait body, being fastened thereto as by screws 12, 12, said loop elements retaining hook devices 13 and being formed with quarterspherical portions 11a to prevent cocking of the hook devices forwardly of the bait body.

A screw eye 14 for attaching a line 15 is screwed into the front end of the bait body and provides a shaft for a spinner 16 which may be arranged thereon between a washer 17 adjacent the bait body and a bead 18 adjacent the eye.

The bait body is comparatively heavy and consequently the hooks 13 are not of sufficient weight to prevent its turning sidewise in the water. Accordingly, a fin 19 is provided on the top of the bait body, this fin preferably being of celluloid and being secured to the bait body by engaging and cementing it in a kerf or slot 20 in the top of the bait body.

At the rear end of the bait a hook-supporting shaft, here shown in the form of a screw eye 21, may be screwed therein to support the hook 22, a sleeve 23 being arranged in said rear end of the bait about the screw eye 21 to stiffen the shank thereof. The sleeve 23 is preferably formed with an extended portion 24 on which a spinner 25 may be journaled and also with an enlarged cupped portion 26 which functions to retain the spinner thereon and also embraces the inner portion of the eye 21 to prevent forward cocking of the hook and interference of the hook with the spinner.

It will be apparent that the above-described bait is simple in construction, easy to manufacture, and will be effective in use. Obviously, modifications thereof may be resorted to without departing from the spirit of the invention or the scope of the appended claims.

What is claimed is:

1. An artificial fish bait comprising a bait body, hooks suspended from the lower side and rear end of the bait body, fastenings secured to the bait body for the hooks including a screw eye threaded into the rear end of the bait body for suspending the rear hook, a sleeve in said end of the bait body about the shank of the screw eye, said sleeve projecting from the end of the bait body, a spinner journaled on the projecting portion of the sleeve, said sleeve being formed with an enlarged cup at its rear end embracing the forward portion of the eye of the screw eye, and a fin on the upper side of the bait body.

2. An artificial fish bait comprising a bait body, hooks suspended from the lower side and rear end of the bait body, fastenings secured to the bait body for the hooks including a screw eye threaded into the rear end of the bait body for suspending the rear hook, a sleeve in said end of the bait body embracing the shank of the screw eye, said sleeve projecting from the end of the bait body, a spinner journaled on the projecting portion of the sleeve, said sleeve being formed with an enlarged cup at its rear end embracing the forward portion of the eye of the screw eye, and a fin on the upper side of the bait body.

3. In an artificial fish bait, a bait body, a shaft projecting from the end of the body and having an eye, a sleeve in the bait body about said shaft, said sleeve projecting from the bait body, a spinner journaled on the projecting portion of the sleeve, the outer end of the sleeve being enlarged to form a cup embracing the eye and retaining the spinner on the sleeve, and a hook suspended on the bait by said eye.

4. In an artificial fish bait, a bait body, a shaft in an end thereof projecting from said body, a sleeve in the bait body about the projecting end of said shaft, a hook suspended on the bait by said shaft, and a spinner journaled upon the sleeve.

HERMAN F. KHOENLE.